United States Patent [19]
Cacas

[11] Patent Number: 5,798,768
[45] Date of Patent: Aug. 25, 1998

[54] METHOD FOR MAPPING BY INTERPOLATION A NETWORK OF LINES, NOTABLY THE CONFIGURATION OF GEOLOGIC FAULTS

[75] Inventor: Marie-Christine Cacas, Nanterre, France

[73] Assignee: Institut Francais du Petrole, Rueil-Malmaison, France

[*] Notice: This patent issued on a continued prosecution application filed under 37 CFR 1.53(d), and is subject to the twenty year patent term provisions of 35 U.S.C. 154(a)(2).

[21] Appl. No.: 544,487

[22] Filed: Oct. 18, 1995

[30] Foreign Application Priority Data

Oct. 18, 1994 [FR] France ................... 94 12515

[51] Int. Cl.⁶ ............................................. G06T 5/00
[52] U.S. Cl. ............................................. 345/441
[58] Field of Search ......................... 395/141, 140, 395/142, 143, 326, 334, 335, 339, 348, 349, 350, 354, 357, 358, 952, 953, 964–970, 928–930; 364/420, 421, 422; 345/440–443, 326, 334, 335, 339, 348, 349, 350, 354, 357, 358, 952, 953, 964–970

[56] References Cited

U.S. PATENT DOCUMENTS 4,467,461  8/1984  Rice ............................................. 367/70
5,465,323  11/1995  Mallet ....................................... 395/120

OTHER PUBLICATIONS

Proceedings of the International Conference on Pattern Recognition (ICPR), Rome, 14–17 Nov. 1988; vol. 2, pp. 897–900, K. Cheng, et al "Analysis and Manipulation Methods of Geographic Informations".

Computer Graphics and Image Processing, Feb. 1978, No. 1, ISSN 0146–664X, pp. 30–51; Toriwaki J–I et al "Extraction of Structural Information from Grey Pictures".

Computers and Geosciences, 1991, UK vol. 17, No. 3, ISSN 0098–3004, pp. 445–463; Lacazette A "A New Sterographic Technique for the Reduction of Scanline Survey Data of Geologic Fractures".

Remote Sensing, Economic Tool for the Nineties, Vancouver, Jul. 10–14, 1989, vol. 3, Institute of Electrical and Electronics Engineers, pp. 1214–1219; Kasvand T "Analytic Primitives in Digital Elev . . . ".

*Primary Examiner*—Almis R. Jankus
*Attorney, Agent, or Firm*—Antonelli, Terry, Stout & Kraus, LLP

[57] ABSTRACT

The invention is a method of representing a configuration of a network of curves or lineaments of objects in a zone of an environment or of a field of vector physical quantities in the zone, by interpolation from known data relative to a position and an orientation of the objects or to values of the quantities, in a plurality of points or locations of the environment, in which a locating pattern of meshes is superimposed on the zone being studied. The invention includes the steps of assigning, to the meshes which are crossed by at least one of the lineaments, an orientation directed depending on that of the lineament, so as to obtain a first discrete distribution of oriented meshes; and determining, according to iterative process, directions to be assigned respectively to the other meshes by comparing directions assigned to the oriented meshes, by selecting for each mesh to be oriented an intermediate direction between an angular interval at most equal to 90° formed by directions of the oriented meshes.

25 Claims, 4 Drawing Sheets

4 km

:cell where data are available

: current cell where a new azimuth is computed initial state at ith iteration    final state at ith iteration

METHOD FOR MAPPING BY INTERPOLATION A NETWORK OF LINES, NOTABLY THE CONFIGURATION OF GEOLOGIC FAULTS

BACKGROUND OF THE INVENTION

FIELD OF THE INVENTION

The invention relates to a mapping method by interpolation for plotting the two-dimensional or the three-dimensional configuration of a network of curves or lineaments representing the distribution of objects in an environment or the variations of vector physical quantities in this environment.

Engineering techniques for naturally fractured subsurface reservoirs are simply based on the geometric characterization of their fracture networks. There is however a lack of tools specially designed for this purpose and suited to the petroleum geologic context. Through lack of these tools, the results of geologic expert evaluations cannot be quantified in terms that are workable by reservoir engineers.

Knowledge of the distribution of fractures in a geologic formation and notably of the orientations thereof is of great importance first for optimizing the location and the spacing between the wells that are to be drilled through an oil formation. Knowledge of the stress field is also very useful since it provides information on the aptitude of fractures for forming a preferential passageway for oil.

Furthermore, the geometry of the network of fractures and particularly the local average orientations thereof conditions the displacement of fluids on the reservoir scale as well as on the local scale, where it determines the permeability anisotropy of the environment in which the oil is trapped. Knowledge of the distribution of the fractures is thus also very useful, at a later stage, for the reservoir engineer who wants to extrapolate the production curves and to calibrate the models for simulating reservoirs.

The development of naturally fractured reservoirs thus requires a better knowledge of the geometry of the fracture networks, of the stress field prevailing therein, and of the contribution of the fractures to the orientation of flows.

It appears that most of the fracture networks observed, and notably in petroleum geology, are incomplete because the measuring tools only detect the largest fractures. The minor fractures of lower extension, which can nevertheless play an important part in the circulation of fluids, remain inaccessible for observation.

The prior art in the field of fracture network modelling is notably illustrated by different documents listed hereafter:

Long J. C. S., and Billaux D., From Field Data to Fracture Network Modelling: An example incorporating spatial structure, Water Resources Res., 23(7), 1201–1216, 1987, Gauthier B. D. M. et al; Probabilistic modelling of faults below the limit of seismic resolution in Pelican field, North Sea, offshore United Kingdom, The AAPG Bulletin, Vol.77, No.5, pp. 761–777, 1993.

The modelling of minor fractures in a known geometry of major fractures raises many difficulties and the results obtained until now are not entirely satisfactory and representative, notably concerning the precise determination of the orientations of the various fractures of a network over their total length.

SUMMARY OF THE INVENTION

The object of the mapping method according to the invention is to plot step by step the two-dimensional configuration of a network of curves or lineaments representing the configuration of objects in a zone of an environment or of a field of vector physical quantities in this zone, by interpolation from known data relative to the position of these objects or the values of these quantities, in a plurality of points or locations of the environment, applicable notably to the study of a geologic formation, in which a locating grid (or mesh pattern) is superimposed on the zone studied.

The invention allows the plotting of a configuration of objects or a field of physical quantities from known data relative to the position of these objects or to the values of these quantities, in a plurality of points or locations of the environment.

The invention may be applied notably to the study of subsurface formations, where it allows the representation, for example, of the orientations of fractures or diaclases or the configuration of a stress field, of the magnetic field, or fluid flow lines, etc, from local measurements obtained by exploring the environment.

Representations obtained with the invention can be used notably by reservoir engineers for optimizing the production of oil reservoirs at different stages of their development.

It comprises:

a) assigning, to the meshes whose neighbourhood is crossed by at least one of the lineaments, an orientation direction depending on that of the lineament, so as to obtain a first discrete distribution of oriented meshes; and b) determining, according to an iterative process, the directions to be lo assigned respectively to the other meshes by comparing those assigned to the oriented meshes, by selecting for each mesh to be oriented an intermediate direction in the angular interval at most equal to 90° formed by the directions of the oriented meshes. It is for example possible to assign to each oriented mesh an orientation value which is the average of the orientations of the lineaments in neighbouring meshes.

According to a particular iterative embodiment, at each iteration, each of the other meshes is assigned an orientation value by working out an average between its current orientation at the end of the previous iteration and the orientation assigned to a neighbouring mesh selected as a function of the direction followed to cross the meshes of the domain.

In the case where the environment studied is a zone of the subsoil, assigning an orientation value to the meshes can be performed as a function of known local values of a stress field prevailing in this zone or of the local orientation of discontinuities (fractures or diaclases for example) within this zone.

The method also applies for establishing a two-dimensional or three-dimensional mapping by assigning orientations step by step to all the meshes of a respectively two-dimensional or three-dimensional grid positioned on the zone, this grid being crossed respectively in four or six directions of displacement.

BRIEF DESCRIPTION OF THE DRAWINGS

Other specific features and advantages of the method according to the invention will be clear from reading the description hereafter of embodiments given by way of non limitative examples, with reference to the accompanying drawings in which.

DESCRIPTION OF THE PREFERRED EMBODIMENTS

Figure 1:
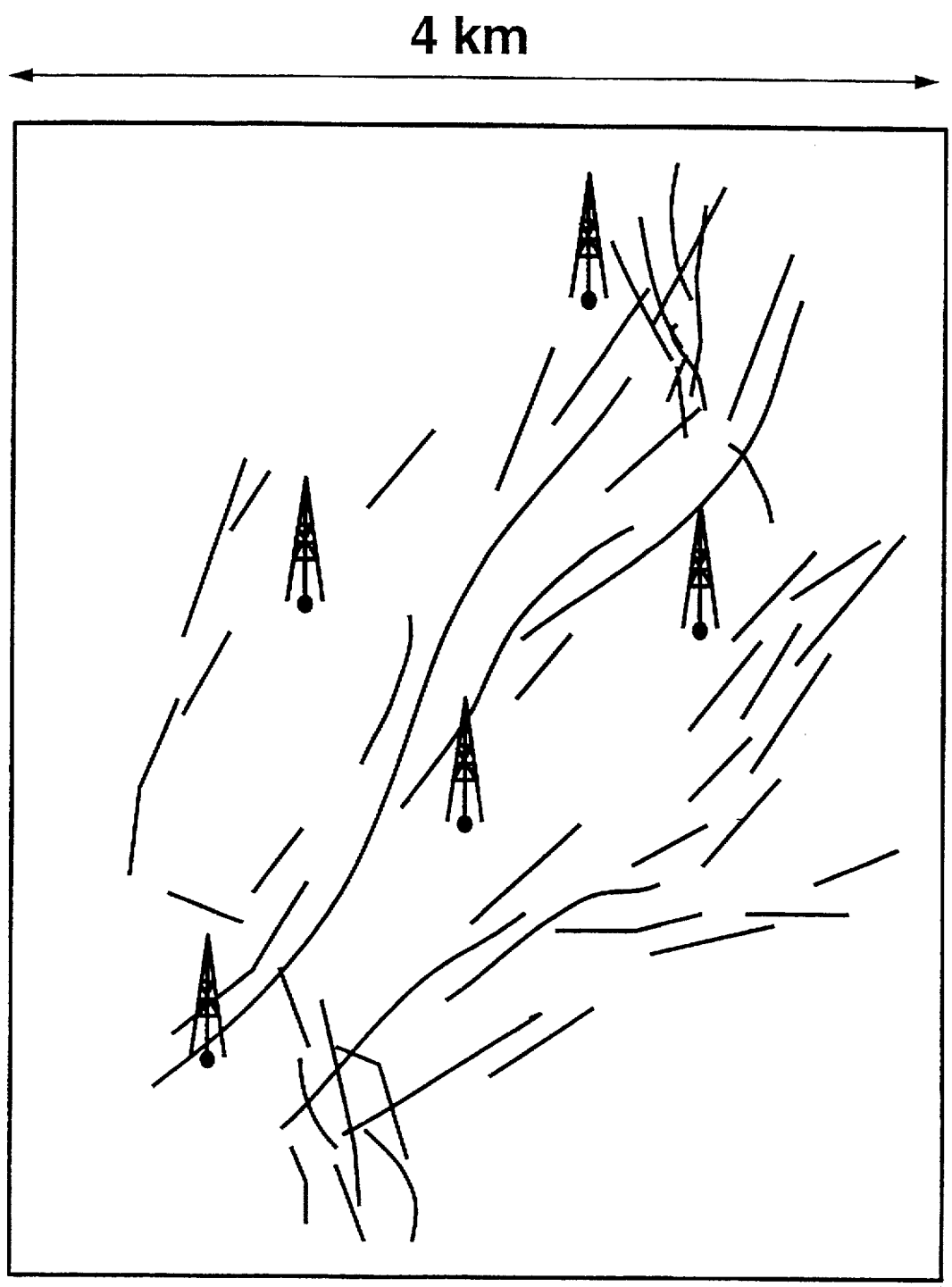
FIG. 1 diagrammatically shows the configuration of a fracture network in a two-dimensional imaging.

As stated above, the object of the method according to the invention is a two-dimensional imaging (or mapping) of a network of lineaments or curves representing the distribution of objects in a zone of an environment or the variations of vector physical quantities in this environment, with applications notably to the study of subsurface zones, as schematized in FIG. 1. This mapping is performed in relation to a grid or mesh pattern superimposed on the zone.

According to the method, the configuration of these lineaments is reconstituted in relation to a discrete set of meshes from which a precise orientation can be assigned to the portions of lineaments crossing them. What is referred to hereafter as "informed" or "oriented" meshes relates to meshes whose lineament orientation is known.

The process for determining the orientation of a lineament network such as that of FIG. 1 comprises two main stages.

Figure 2A:
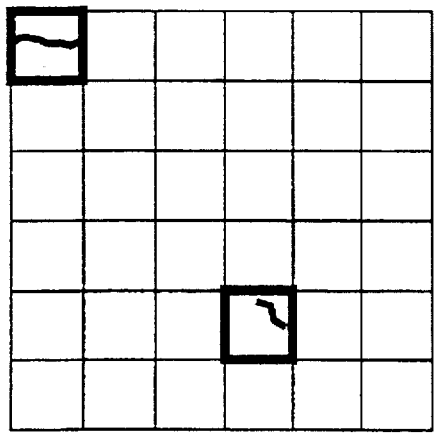
FIGS. 2A to 2D show successive stages in which orientations are assigned to meshes of a grid superimposed on the domain, intermediate between "oriented" meshes.
Figure 2B:
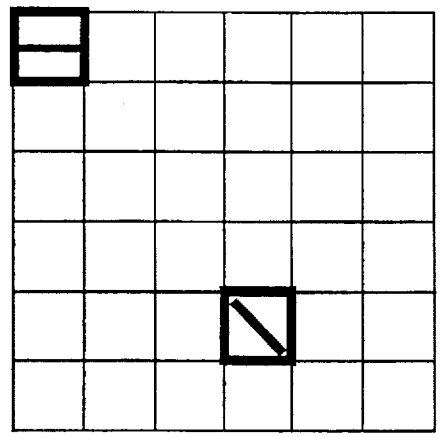

In the first one, a neighbourhood is assigned to each mesh of the grid and it is checked to determine if it is intersected by lineaments. If an intersection is present, an orientation value obtained by working out the average of the orientations of the lineaments situated in the intersection's neighbourhood is assigned to the mesh (FIGS. 2A, 2B). At the end of this first stage, a certain number of meshes is thus provided with an orientation value (informed or oriented meshes). What is referred to hereafter as uninformed meshes relates to the other meshes which are not yet provided with this orientation value.

In a second stage, the orientations of the uninformed meshes are extrapolated from the informed meshes according to an iterative process described as follows:

iteration 0 (or initialization)

Figure 2C:
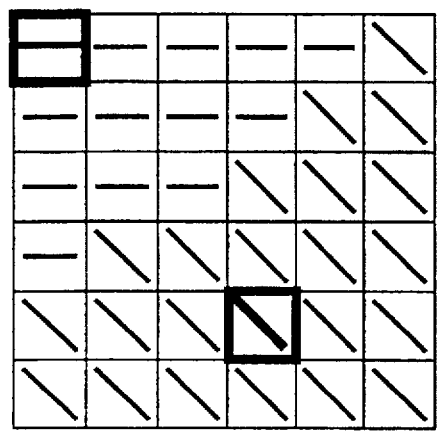
Figure 2D:
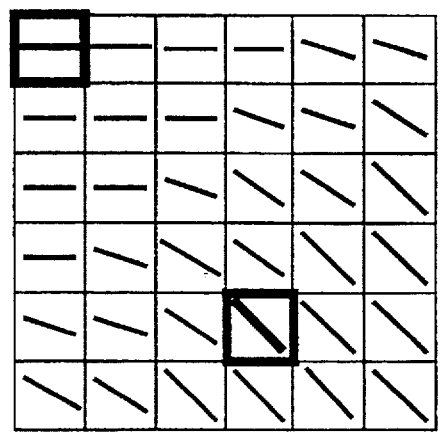
Figure 2D:
Figure 3A:
FIGS. 3A to 3D illustrate the process of crossing a mesh pattern with interpolation of the orientations assigned to neighbouring meshes.
Figure 3A:
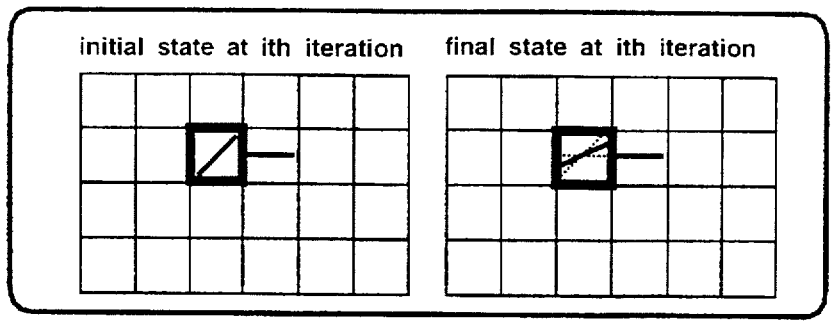
Figure 3B:
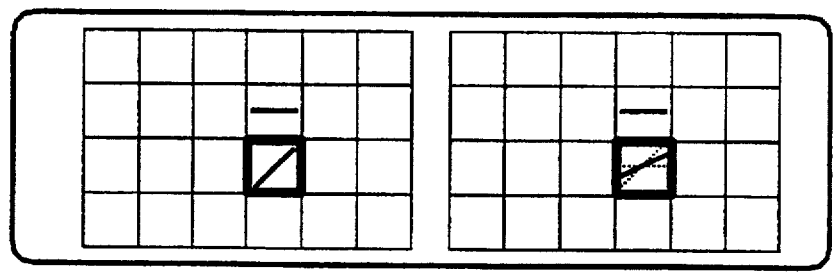
Figure 3C:
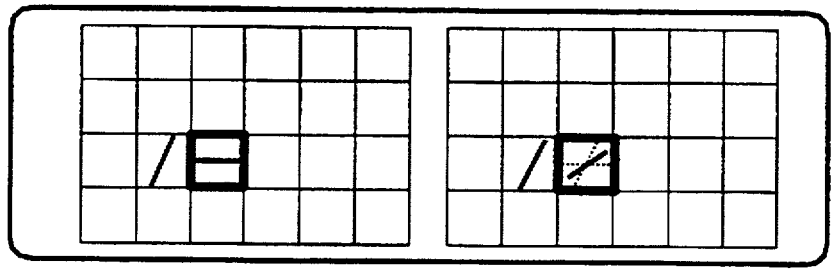
Figure 3D:
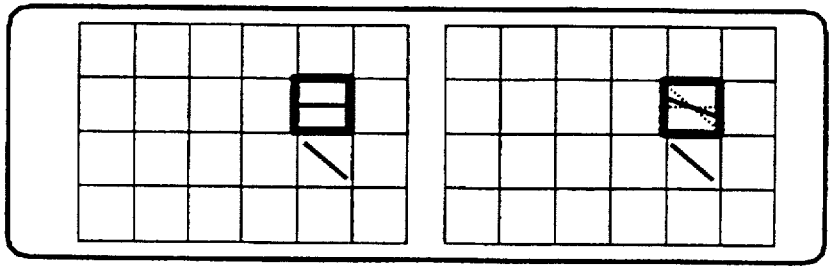

An orientation value equal to that of the nearest informed mesh is first assigned to the uninformed meshes (FIG. 2C).

iteration i (i>0)

a) a current orientation obtained by working out the average between its orientation at the end of the iteration stage (i−1) and the orientation of the mesh on its right (FIGS. 3A, 3B) is assigned to each mesh that is not informed prior to the initialization and that is encountered in the domain when crossing it from left to right, provided that it is not on the right edge of the domain;

b) an orientation obtained by working out the average between its current orientation and the orientation of the mesh situated above (FIG. 3B) is assigned to each mesh that is not informed prior to the initialization and that is encountered in the domain when crossing it upwards, provided that it is not on the upper edge of the domain;

c) an orientation obtained by working out the average between its current orientation and the orientation of the mesh situated on its left (FIG. 3C) is assigned to each mesh that is not informed prior to the initialization and that is encountered in the domain while crossing it from right to left, provided that it is not situated on the left edge of the domain;

d) an orientation obtained by working out the average between its current orientation and the orientation of the mesh situated below (FIG. 3D) is assigned to each mesh that is not informed prior to the initialization and that is encountered in the domain while crossing it downwards, provided that it is not situated on the lower edge of the domain.

At each iteration, stages a, b, c, d can be performed in any order.

The iterative process is continued until the orientation values remain stable from one iteration to the next. However, if certain orientation values are not stabilized when the number of iterations reaches the number of meshes of the domain, this means that these meshes have an indeterminate orientation because they are at an equal distance from the uninformed meshes with contradictory orientations (for example 0°, 120° and 240°). In this case, only a modification to the set of data can remove the uncertainty.

Figure 4:
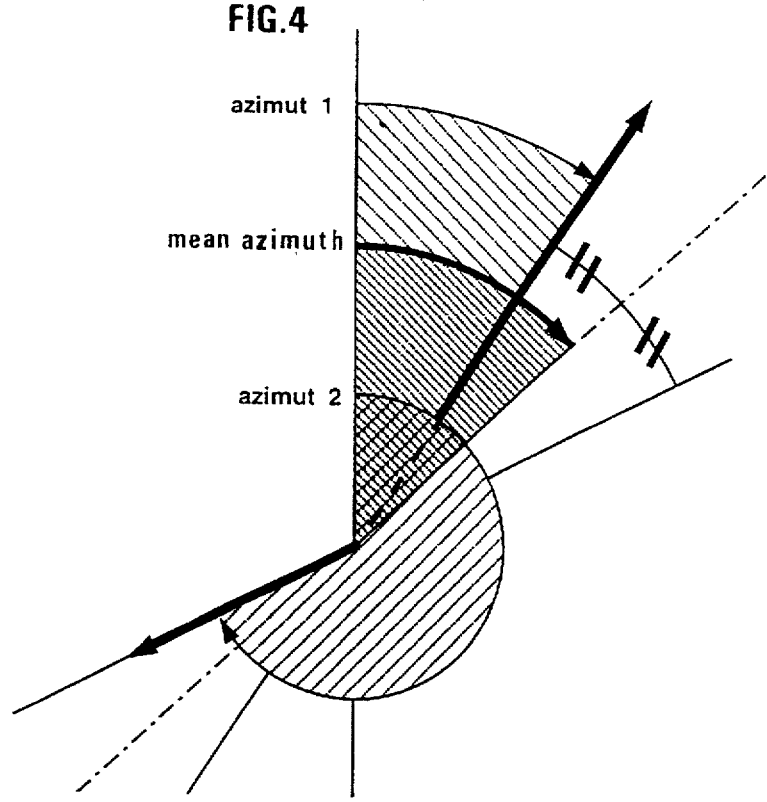
FIG. 4 illustrates the assignment of a mean azimuth to a mesh.
Figure 5:
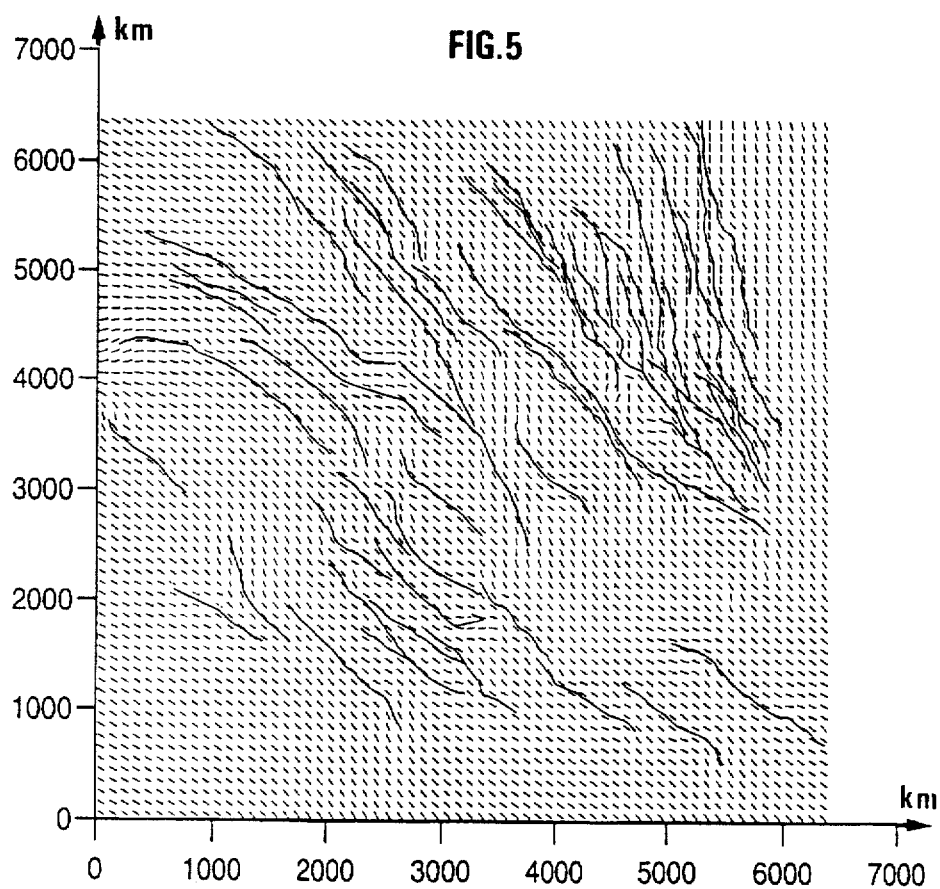
FIG. 5 shows a real mapping example obtained by applying the method.

For determining averages, the average of two azimuths is the azimuth of the bisectrix of the smallest angle between two straight lines borne by these azimuths as shown in FIG. 4, and not simply the scalar average of two angles. The mean value of the azimuths 0° and 180° for example is thus not 90° but 0°. There are two possible mean values for perpendicular orientations. The mean value to be adopted therefore has to be agreed upon beforehand in this case.

The orientation values initially assigned to a certain number of so-called informed or oriented meshes can be obtained in different ways, according to the field of application of the method.

In the applications of the method relative to the study of geologic structures, the collection of initial data relating to the values in a plurality of points of the stress zone studied or to the local orientation of fractures can be performed through the analysis of rock samples taken during drilling. The initial data on the configuration and the orientation of the major fractures can also be obtained by seismic exploration.

The method can be extended to allow the volume mapping by interpolation of three-dimensional vector quantities. The volume is meshed by a cubic network. The "informed" or "oriented" meshes are characterized by a vector with three components. An interpolation method similar to that described above is applied, apart from the fact that each iteration i comprises not 4 stages a), b), c), d) but 6 in order to take account of the depth displacements in the direction of the third dimension. On the whole, there are 4 directions of crossing of the mesh pattern in a plane:

a) left→right,
b) bottom→top,
c) right→left,
d) top→bottom, as previously, and two additional depth directions:

e) front→back and
f) back→front.

The average of two three-dimensional vectors is worked out in the plane containing the two vectors according to the same convention as previously.

I claim:

1. A method of representing a configuration of a network of curves or lineaments of objects in a zone of an environment or of a field of vector physical quantities in the zone, by interpolation from known data relative to a position and an orientation of the objects or to values of the quantities, in a plurality of points or locations of the environment, in which a locating pattern of meshes is superimposed on the zone being studied, comprising:

a) assigning, to the meshes which are crossed by at least one of the curves or lineaments, an orientation direction depending on that of the curve or lineament, so as to obtain a first discrete distribution of oriented meshes;

b) determining, according to an iterative process, directions to be assigned respectively to other meshes by comparing directions assigned to the oriented meshes, by selecting for each mesh to be oriented an intermediate direction between an angular interval at most equal to 90° formed by directions of the oriented meshes; and c) in response to the determining of the directions producing at least a two-dimensional representation of the curves or lineaments.

2. A method as claimed in claim 1, wherein an orientation value that is the average of the orientations of the lineaments in neighboring meshes is assigned to each oriented mesh.

3. A method as claimed in claim 2, wherein at each iteration, an orientation value is assigned to each of the other meshes by calculating an average between the other meshes current orientation at an end of a previous iteration and an orientation assigned to a neighboring mesh selected as a function of a direction followed to cross the meshes of the mesh pattern.

4. A method as claimed in claim 3, wherein the representing of the configuration is established by assigning step by step orientations to all the meshes of a two-dimensional grid positioned on the zone with the grid being crossed in four directions of displacement.

5. A method as claimed in claim 4, wherein the environment being studied is a subsoil zone and assigning an orientation value to the meshes is performed as a function of known local values of a stress field prevailing in the subsoil zone.

6. A method as claimed in claim 4, wherein the environment being studied is a subsoil zone and assigning an orientation value to the meshes is performed as a function of known local values defining the orientation of a network of discontinuities within the subsoil zone.

7. A method as claimed in claim 2, wherein the environment being studied is a subsoil zone and assigning an orientation value to the meshes is performed as a function of known local values of a stress field prevailing in the subsoil zone.

8. A method as claimed in claim 2, wherein the environment being studied is a subsoil zone and assigning an orientation value to the meshes is performed as a function of known local values defining the orientation of a network of discontinuities within the subsoil zone.

9. A method as claimed in claim 3, wherein the representing of the configuration is established by assigning step by step orientations to all the meshes of a three-dimensional grid positioned on the zone with the grid being crossed in six directions of displacement.

10. A method as claimed in claim 9, wherein the environment being studied is a subsoil zone and assigning an orientation value to the meshes is performed as a function of known local values of a stress field prevailing in the subsoil zone.

11. A method as claimed in claim 9, wherein the environment being studied is a subsoil zone and assigning an orientation value to the meshes is performed as a function of known local values defining the orientation of a network of discontinuities within the subsoil zone.

12. A method as claimed in claim 3, wherein the environment being studied is a subsoil zone and assigning an orientation value to the meshes is performed as a function of known local values of a stress field prevailing in the subsoil zone.

13. A method as claimed in claim 3, wherein the environment being studied is a subsoil zone and assigning an orientation value to the meshes is performed as a function of known local values defining the orientation of a network of discontinuities within the subsoil zone.

14. A method as claimed in claim 1, wherein at each iteration, an orientation value is assigned to each of the other meshes by calculating an average between the other meshes current orientation at an end of a previous iteration and an orientation assigned to a neighboring mesh selected as a function of a direction followed to cross the meshes of the mesh pattern.

15. A method as claimed in claim 14, wherein the representing of the configuration is established by assigning step by step orientations to all the meshes of a two-dimensional grid positioned on the zone with the grid being crossed in four directions of displacement.

16. A method as claimed in claim 15, wherein the environment being studied is a subsoil zone and assigning an orientation value to the meshes is performed as a function of known local values of a stress field prevailing in the subsoil zone.

17. A method as claimed in claim 15, wherein the environment being studied is a subsoil zone and assigning an orientation value to the meshes is performed as a function of known local values defining the orientation of a network of discontinuities within the subsoil zone.

18. A method as claimed in claim 14, wherein the representing of the configuration is established by assigning step by step orientations to all the meshes of a three-dimensional grid positioned on the zone with the grid being crossed in six directions of displacement.

19. A method as claimed in claim 18, wherein the environment being studied is a subsoil zone and assigning an orientation value to the meshes is performed as a function of known local values of a stress field prevailing in the subsoil zone.

20. A method as claimed in claim 18, wherein the environment being studied is a subsoil zone and assigning an orientation value to the meshes is performed as a function of known local values defining the orientation of a network of discontinuities within the subsoil zone.

21. A method as claimed in claim 14, wherein the environment being studied is a subsoil zone and assigning an orientation value to the meshes is performed as a function of known local values of a stress field prevailing in the subsoil zone.

22. A method as claimed in claim 14, wherein the environment being studied is a subsoil zone and assigning an orientation value to the meshes is performed as a function of known local values defining the orientation of a network of discontinuities within the subsoil zone.

23. A method as claimed in claim 1, wherein the environment being studied is a subsoil zone and assigning an orientation value to the meshes is performed as a function of known local values of a stress field prevailing in the subsoil zone.

24. A method as claimed in claim 1, wherein the environment being studied is a subsoil zone and assigning an orientation value to the meshes is performed as a function of known local values defining the orientation of a network of discontinuities within this subsoil zone.

25. A method in accordance with claim 1, wherein the environment being studied is a geological formation.

* * * * *